United States Patent Office 3,418,393
Patented Dec. 24, 1968

3,418,393
BLOCK COPOLYMERS OF POLYPIVALOLACTONE AND CARBOXYL GROUP CONTAINING POLYMERS
Charles King, Sherwood Park, Wilmington, Del., assignor to E. I. du Pont de Nemours and Company, Wilmington, Del., a corporation of Delaware
No Drawing. Filed May 19, 1966, Ser. No. 551,225
6 Claims. (Cl. 260—857)

ABSTRACT OF THE DISCLOSURE

The use of specified carboxyl group-containing polymers or salts thereof as inititators or chain-transfer agents in the polymerization of pivaloactone and the resultant dye-receptive block copolymers are disclosed. One such preparation utilizes the tetrabutyl salt of 0.4 g. of poly-(4-vinylpyridine/acrylic acid) in tetrahydrofuran to polymerize 20 g. of pivalolactone and to form the block copolymer of polypivalolactone and poly(4-vinylpyridine/acrylic acid).

This invention relates to novel modifications of polypivalolactone, and to a new method for preparing these products.

Pivalolactone polymerizes in the presence of a suitable initiator such as triethylamine to form polypivalolactone, a polymer of high utility for the production of various textile materials, including garments requiring only minimum care. However, the fibers have relatively low affinity for most dyes, a circumstance which severely restricts the suitability of the fibers for use in the production of colored fabrics.

In accordance with the present invention, pivalolactone is polymerized in the presence of a polymer containing a plurality of functional groups selected from the class consisting of sulfonate groups, amide groups, and tertiary amine groups; said polymer containing, in addition to said functional groups, at least one carboxyl group or salt thereof.

The polymer in the presence of which the polymerization of the pivalolactone is carried out should comprise from about 0.5 to about 20% of the weight of pivalolactone, and it should include from about 0.005 to about 0.2 of the said sulfonate groups, amide groups, or tertiary amine groups per molecule of pivalolactone. The added polymer may itself serve as the initiator for the polymerization of the pivalolactone, especially when it contains a carboxylate salt group; or a separate initiator for the pivalolactone polymerization can be added. In either case, the added polymer forms a block copolymer with polypivalolactone as the polymerization proceeds, the added polymer acting either as an initiator for the polymerization reaction or as a chain-transfer agent in the polymerization reaction.

The added polymer may be either a homopolymer or a copolymer, and it may contain a plurality of carboxyl groups or only one such group, which may be at the end of the polymer molecule of a carboxyl group pendant from the polymer chain. A quaternary ammonium salt of the carboxylate is preferred because the quaternary ammonium carboxylate salts are highly effective initiators; however, the sodium, potassium, or other salts may be used. The effective form is the anion shown as Formula I,
which initiates the polymerization of pivalolactone (Formula II) according to the equation

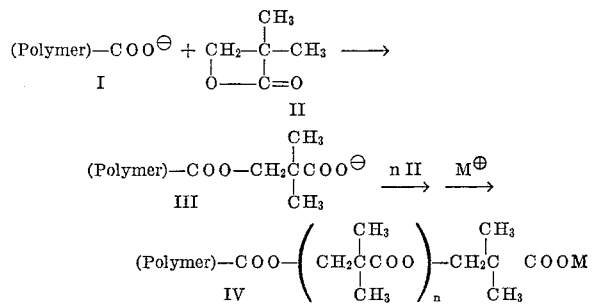

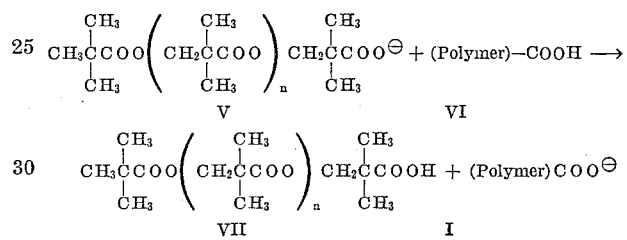

wherein M⊕ is a cation such as a metallic ion or a quaternary ammonium ion and $n$ is at least 30.

In one variation of the process of the invention, an initiator such as tetrabutylammonium pivalate is used and the added polymer is employed in its acidic form, Formula VI, in which form it reacts as a chain-transfer agent with a carboxylate anion end group of a growing polymer chain, Formula V:

$$CH_3\underset{CH_3}{\underset{|}{C}}COO\left(CH_2\underset{CH_3}{\underset{|}{C}}COO\right)_n CH_2\underset{CH_3}{\underset{|}{C}}COO^\ominus + \text{(Polymer)}-COOH \longrightarrow$$

V                          VI $$CH_3\underset{CH_3}{\underset{|}{C}}COO\left(CH_2\underset{CH_3}{\underset{|}{C}}COO\right)_n CH_2\underset{CH_3}{\underset{|}{C}}COOH + \text{(Polymer)}COO^\ominus$$

VII                         I after which the anionic form I of the added polymer enters into reaction with unreacted pivalolactone as shown in the preceding equation. It is to be understood that the foregoing reactions illustrate the manner in which the added polymer is believed to be incorporated in the modified polypivalolactone; although the equations are not to be taken as limiting.

Polypivalolactone may be designated by various alternative names, such as poly(oxycarbonyl-1,1-dimethyldimethylene), multi(oxycarbonyl-1,1-dimethyldimethylene), poly-(2,2-dimethyl-3-propiolactone), and poly(hydroxypivalic acid). This polyester is readily prepared by the polymerization of pivalolactone, the intra-molecular ester of hydroxypivalic acid, as disclosed by Reynolds and Vickers in their British Patent No. 766,347; or by the polymerization of hydroxypivalic acid as disclosed by Alderson in his U.S. Patent No. 2,658,055. In the present invention, the starting material is pivalolactone and the polymerization is carried out in the presence of a carboxyl-containing polymer or salt thereof. An initiator is required to make the reaction progress at a reasonable speed, and as noted above the added polymer may serve this purpose when its carboxylate group is in the form of a salt. When the polymer contains a free carboxylic acid group and is used as a chain-transfer agent, another material is added as an initiator. Among various compounds suitable as initiators are included such tertiary amines and quaternary ammonium compounds as triethylenediamine, tetrabutylammonium hydroxide, tetrabutylammonium bromide, tetraheptylammonium iodide, and tetraethylammonium chloride. The concentration of the initiator is usually in the range of about 0.001–1 mol percent, based on the pivalolactone. The polymer to be added is usually employed in the form of a solution in a suitable organic solvent such as tetrahydrofuran.

In the examples below, the term "inherent viscosity" is defined as the polymer property determined in accordance with the following relationship:

$$\eta_{inh} = \frac{\ln \eta_{rel}}{c}$$

wherein the relative viscosity, $\eta_{rel}$, is calculated by dividing the flow time in a capillary viscometer of a dilute solution of the polymer by the flow time for the pure solvent, trifluoroacetic acid. The concentration ($c$) used in the examples is 0.5 gram of polymer per 100 ml. of solution and the temperature used is 30° C. An inherent viscosity of at least about 0.5 is desired for the polymers employed in this invention to be used in films. For fiber applications an inherent viscosity of at least about 0.75 is desirable.

EXAMPLE 1

Poly(4-vinylpyridine/tetrabutylammonium acrylate) as initiator

A mixture of 21.0 g. (0.20 mol) of 4-vinylpyridine, 1.44 g. (0.020 mol) of acrylic acid, 0.02 g. (0.00012 mol) of azobisisobutyronitrile, and 100 ml. of benzene is heated at reflux for six hours. A copolymer forms and separates as a precipitate. The supernatant liquid is decanted, and the precipitate is dissolvde in methanol. Upon concentration of the solution, 2.8 g. of product is obtained in the form of a brittle foam. The copolymeric product has the composition, poly(4-vinylpyridine/acrylic acid) (8/1), as shown by titration of known weights of the copolymer with standard acid and base solutions.

To a solution of 0.4 g. of poly(4-vinylpyridine/acrylic acid) (8/1) in methanol is added 0.46 ml. of an 0.96 molar solution of tetrabutylammonium hydroxide in methanol. The methanol is stripped from the solution at room temperature under reduced pressure, and the residue is dissolved in 200 ml. of hot anhydrous tetrahydrofuran. The resulting solution is cooled to room temperature and 20 g. (0.20 mol) of pivalolactone is added. The mixture is heated, whereupon polymerization occurs. Refluxing is continued for 45 minutes, after which the precipitated product, a block copolymer of polypivalolactone and poly(4-vinylpyridine/acrylic acid), is collected by filtration of the reaction mixture. The precipitate is dried for two hours at 90° C. under a pressure of approximately 1 mm. of mercury. The dry product weighs 20 g. It has an inherent viscosity of 1.24 and contains 0.24% nitrogen by analysis, corresponding to 1.7 mol percent of the amine group per repeating ester structural unit derived from pivalolactone.

The copolymer is press-spun at 230° C. through an orifice 0.30 mm. (0.012 inch) in diameter, the resulting extruded filament being passed into ice water and wound at 366 meters/min. (400 y.p.m.). Two such filaments are plied and the resulting yarn is drawn 2.2× over a curved hot plate at 145° C., heated taut at 175° C. for two hours, and boiled off by immersion in boiling water for 30 minutes under zero tension. The filaments comprising the boiled-off yarn have a tenacity of 3.4 g.p.d., an elongation of 85%, and an initial modulus of 32 g.p.d.

0.30 g. of the resulting yarn is place din a bath consisting of 30 ml. of water, 0.010 g. of sodium lauryl sulfate, and 0.012 g. of C.I. 62,055 dye (the acid dye identified by Colour Index No. 62,055). The pH is adjusted to 2 with dilute hydrochloric acid, and the bath is heated at 98° C. for one hour. The yarn is dyed a medium shade of blue. A control sample of fibers of the corresponding homopolymer, polypivalolactone, adsorbs virtually none of the dye, being unstained when treated in the same dyebath by the same procedure.

EXAMPLE 2

Poly(2-methyl-5-vinylpyridine/tetrabutylammonium acrylate) as initiator

A solution of 357 g. (3.0 mol) of 2-methyl-5-vinylpyridine, 2.8 g. (0.039 mol) of acrylic acid, 3.0 g. (0.018 mol) of azobisisobutyronitrile, and 1500 ml. of benzene is refluxed under nitrogen for one hour. The solution is then poured into four liters of stirred hexane to precipitate the product, which is collected by filtration and washed on the filter with hexane. The product, poly(2-methyl-5-vinylpyridine/acrylic acid) (37/1), is dried first in air and then for one hour at 50° C. under a pressure of approximately 1 mm. of mercury. The yield of the copolymer is 74.0 g.

A samp'e of the copolymer is dissolved in methanol and titrated to the equivalence point with a methanolic solution of tetrabutylammonium hydroxide (neutralization equivalent 3950). The methanol is stripped from the resulting solution under vacuum at room temperature, yielding the tetrabutylammonium salt of the copolymer. A dry, 3-liter flask equipped with stirrer, condenser with drying tube, thermometer, and nitrogen inlet is charged with a solution of 12.0 g. of the tetrabutylammonium salt of the copolymer in 1500 ml. of anhydrous tetrahydrofuran. A solution of 215 g. (2.15 mol) of pivalolactone in 200 ml. of tetrahydrofuran is added, and an exothermic reaction is observed. As the exothermic reaction begins to subside, heating is commenced and the mixture is maintained at reflux for four hours, after which the precipitated product, a block copolymer of polypivalolactone and poly(2-methyl-5-vinylpyridine/acrylic acid), is collected by filtration, washed with tetrahydrofuran, and dried in air. It is then dried for two hours at 150° C. under a pressure of approximately 1 mm. of mercury. The product has an inherent viscosity of 1.38 and contains 0.44% nitrogen by analysis, corresponding to 3.1 mol percent of the amine group per repeating ester structural unit derived from pivalolactone.

The copolymer is melt-spun at 254° C. through a spinneret containing 15 orifices, each 0.23 mm. (0.009 inch) in diameter, the resulting extruded filaments being passed into water maintained at 5° C., gathered as a yarn, and passed to a forwarding roll operated at a peripheral speed of 730 meters/min. (800 y.p.m.). The yarn is passed from the forwarding roll to a draw roll operating at 825 meters/min. (900 y.p.m.), the draw ratio being 1.12×, and is wound up at 794 meters/min. (867 y.p.m.). The drawn yarn is heated taut at 175° C. for one hour, after which it is boiled off for 30 minutes. The filaments comprising the boiled off yarn have a tenacity of 2.5 g.p.d., an elongation of 119%, and an initial modulus of 29 g.p.d. The drawn yarn is dyed to a deep shade of blue with C.I. 62,055 dye, employing the dyeing procedure used in Example 1.

EXAMPLE 3

Poly(dimethylaminoethyl methacrylate/ethyl methacrylate/tetrabutylammonium methacrylate) as initiator A solution of 18.1 g. (0.159 mol) of ethyl methacrylate, 15.9 g. (0.100 mol) of dimethylaminoethyl methacrylate, 0.20 g. (0.00061 mol) of tetrabutylammonium methacrylate, 0.26 g. (0.0016 mol) of azobisisobutyronitrile, and 100 ml. of hexane is refluxed for two hours. The solution of the resulting copolymer, poly(dimethylaminoethyl methacrylate/ethyl methacrylate/tetrabutylammonium methacrylate), is placed in a 5-liter flask equipped with a stirrer and condenser with drying tube. To the flask is added 3 liters of anhydrous acetonitrile, 1.85 ml. of 1 molar tetrabutylammonium hydroxide solution in methanol, and 370 g. (3.70 mol) of pivalolactone. The mixture is stirred for one hour at room temperature and is then heated at reflux for one hour. A white precipitate forms and is collected by filtration, washed with methanol, and dried. The yield of the product, a block copolymer of polypivalolactone and poly(dimethylaminoethyl methacrylate/ethyl methacrylate/tetrabutylammonium methacrylate), is 367 g. It has an inherent viscosity of 1.10 and contains 0.22% nitrogen by analysis, corresponding to 1.6 mol percent of the amine group per repeating ester structural unit derived from pivalolactone.

The copolymer is melt-spun at 262° C. through a spinneret containing 15 orifices, each 0.23 mm. (0.009 inch) in diameter, the resulting extruded filaments being passed into water maintained at 5° C., gathered as a yarn, and taken up by a forwarding roll operating at a peripheral speed of 730 meters/min. (800 y.p.m.). The yarn is passed from the forwarding roll to a draw roll operating at 760 meters/min. (833 y.p.m.), the draw ratio being 1.04×, and is wound up at 730 meters/min. (800 y.p.m.). The drawn yarn is heated taut at 170° C. and is then boiled off for one hour. The filaments comprising the boiled-off yarn have a tenacity of 2.7 g.p.d., an elongation of 123%, and an initial modulus of 24 g.p.d. The drawn yarn is dyed to a medium shade of blue with C.I. 62,055 dye, employing the dyeing procedure used in Example 1.

EXAMPLE 4

Tetrabutylammonium salt of poly(N,N'-diethylhexamethylene sebacamide) as initiator The salt of N,N'-diethylhexamethylenediamine and sebacic acid (M.P. 113–114° C., pH 9.1 in 1% aqueous solution) is heated for six hours in a sealed polymer tube at 215° C. The tube is opened and the mixture is heated at 283° C. at atmospheric pressure under nitrogen for two hours and then at a pressure of 1 mm. of mercury for four hours with a nitrogen bleed. The product is poly (N,N'-diethylhexamethylene sebacamide), is polyamide having carboxyl end groups. The polyamide is dissolved in 150 ml. of tetrahydrofuran and is titrated potentiometrically to the equivalence point with 1 molar tetrabutylammonium hydroxide. The solution is concentrated and the residue is dried in a vacuum oven, after which it is redissolved in tetrahydrofuran to give a solution containing 14.2% solids.

A quantity of 21.04 g. of this copolymer solution prepared as described above is dissolved in 200 ml. of tetrahydrofuran, and a solution of 27.0 g. (0.27 mol) of pivalolactone in 50 ml. of tetrahydrofuran is added. The reaction mixture is allowed to stand for three hours, during which time a precipitate forms. The precipitate is collected by filtration, washed with ethanol, and dried for 48 hours at 150° C. under a pressure of approximately 1 mm. of mercury. The yield of the product, a block copolymer of polypivalolactone and poly(N,N'-diethylhexamethylene sebacamide), is 27.7 g. It has an inherent viscosity of 1.39 and on the basis of the proportions used contains 7.1 mol percent of the amide group per repeating ester structural unit derived from pivalolactone.

The copolymer is press-spun at 248° C. through an orifice 0.30 mm. (0.012 inch) in diameter, the resulting extruded filament being passed into water maintained at 5° C. and wound at 457 meters/min. (500 y.p.m.). Two such filaments are plied and the resulting yarn is drawn 1.6× over a curved hot plate at 120° C., heated taut at 170° C. for two hours, and boiled off. The filaments comprising the boiled-off yarn have a tenacity of 6.1 g.p.d., an elongation of 82%, and an initial modulus of 27 g.p.d.

0.100 g. of the resulting yarn is placed in a bath consisting of 10 ml. of water, 0.1 of glacial acetic acid, 0.05 g. of a pasting agent comprising the sodium salt of a sulfonated hydrocarbon, and 0.004 g. of the red disperse dye prepared in accordance with the procedure of Example 2 of U.S. Patent 2,109,024. When the bath is heated for one hour at 98° C., the yarn is dyed to a deep, dark red shade. A control sample of fibers of the corresponding homopolymer, polypivalolactone, is dyed only a pale orange using the same dyeing procedure.

EXAMPLE 5

Tetrabutylammonium salt of poly(styrenesulfonate/4-mercaptobutyrate) as initiator In a 500-ml. flask equipped with a stirrer, condenser, nitrogen inlet, and two Gilmont pipets is placed 5.155 g. (0.250 mol) of sodium styrenesulfonate and 200 ml. of water. The flask is immersed in an oil bath maintained at 130° C. At each of the following times, 4-mercaptobutyric acid is added in 0.1 ml. quantities: 0, 1.9, 3.0, 4.3, 6.0, 7.9, 9.2, 11.0, 12.9, 15.0, 16.8, 19.0, 21.2, 24.0, 26.0, 29.0, 31.8, 34.8, 38.1, 42.0, 45.9, 50.0, 55.0, 60.3, 67.0, 74.0, 84.0, 95.8, and 112.0 minutes. At each of the following times, diethyl azobisisobutyrate is added in 0.33 ml. portions: 0, 7.4, 14.8, 22.2, 29.6, 37.0, 44.0, 51.8, 59.2, 66.6, 74.0, 81.5, 88.8, and 96.1 minutes. After additions of all the reagents have been completed, the solution is heated for an additional 2.5 hours and is then cooled. The solution is extracted twice with 200 ml. of ether, following which the aqueous ploymer-salt solution is converted to the free acid by passing it through a column of acid-form ion-exchange resin. The solution is then titrated to a pH of 7.65 with tetrabutyl-ammonium hydroxide, and the water is stripped from the mixture under reduced pressure. The residue is dried at a pressure of approximately 1 mm. of mercury over phosphorus pentoxide to give 95.2 grams of a white solid, the tetrabutylammonium salt of poly(styrenesulfonic acid) chain-terminated with 4-mercaptobutyric acid.

A solution of 56.0 g. of this tetrabutylammonium salt in 10.5 liters of acetonitrile is heated to reflux, and 1050 g. (10.5 mols) of pivalolactone is added. A polymer slurry forms. Refluxing is continued for a total of 2.5 hours, after which the mixture is cooled and the polymer is collected on a Buchner funnel. The product is dried in air and then at 100° C. under a pressure of approximately 1 mm. of mercury. The dry product weighs 1085 g. and has an inherent viscosity of 1.15. On the basis of proportions used it contains 1.2 mol percent of the sulfonate group per repeating ester structural unit derived from pivalolactone.

The copolymer is melt-spun at 250° C. from a spinneret having 15 orifices, each 0.23 mm. (0.009 inch) in diameter, the resulting extruded filaments being passed into water maintained at 5° C., gathered as a yarn, and passed to a forwarding roll operated at a peripheral speed of 548 meters/min. (600 y.p.m.). The yarn is passed from the forwarding roll to a draw roll operating at 640 meters/min. (700 y.p.m.), the draw ratio being 1.16×, and is wound up at 627 meters/min. (687 y.p.m.). The drawn yarn is heated taut at 175° C. for 16 hours, after which it is boiled off for 30 minutes. The filaments comprising the boiled-off yarn have a tenacity of 3.0 g.p.d., an elongation of 116%, and an intial modulus of 30 g.p.d.

0.100 g. of the resulting yarn is placed in a bath consisting of 10 ml. of water, 0.02 ml. of glacial acetic acid, and 0.004 g. of the basic dye identified by Colour Index No. 51,004. When dyed at 145° C. for one hour in a sealed tube, the yarn is dyed a deep shade of blue. A control sample of fibers of the corresponding homopolymer, polypivalolactone, remains undyed when heated in a dyebath of the same composition under the same conditions.

What is claimed is:

1. A method for preparing a dye receptive block copolymer comprising polymerizing pivalolactone in the presence of a carboxyl group-containing polymer or salt thereof which acts as an initiator or chain-transfer agent in the pivalolactone polymerization reaction, said polymer having a plurality of functional groups selected from the class consisting of sulfonate, amide and tertiary amine groups, wherein from about 0.005 to about 0.2 of said functional groups are present in the polymer per molecule of pivalolactone and said polymer is present to the extent of from about 0.5 and about 20% by weight of the pivalolactone.

2. A block copolymer of polypivalolactone and about 0.5 to about 20% by weight of poly(4-vinylpyridine/acrylic acid), wherein the weight percentages are based upon the polypivalolactone.

3. A block copolymer of polypivalolactone and about 0.5 to about 20% by weight of poly(2-methyl-5-vinylpyridine/acrylic acid), wherein the weight percentages are based upon the polypivalolactone.

4. A block copolymer of polypivalolactone and about 0.5 to about 20% by weight of poly(dimethylaminoethyl methacrylate / ethyl methacrylate / tetrabutylammonium methacrylate), wherein the weight percentages are based upon the polypivalolactone.

5. A block copolymer of polypivalolactone and about 0.5 to about 20% by weight of poly(N,N'-diethylhexamethylene sebacamide), wherein the weight percentages are based upon the polypivalolactone.

6. A block copolymer of polypivalolactone and about 0.5 to about 20% by weight of poly(styrenesulfonate/4-mercaptobutyrate), wherein the weight percentages are based upon the polypivalolactone.

References Cited

UNITED STATES PATENTS 3,299,171   1/1967   Knobloch et al. _____ 260—857

MURRAY TILLMAN, *Primary Examiner.*

P. LIEBERMAN, *Assistant Examiner.*

U.S. Cl. X.R.

260—895, 874, 901, 78.3, 78